Figure 1:
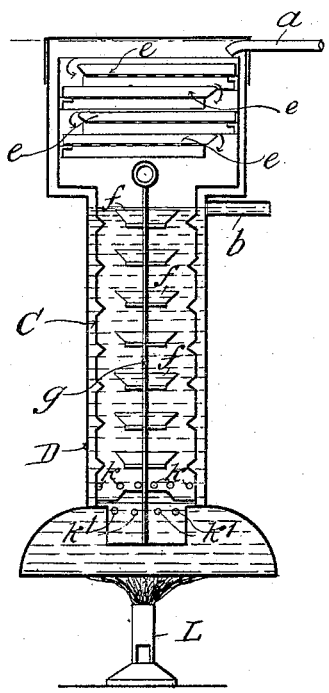
Figure 2:
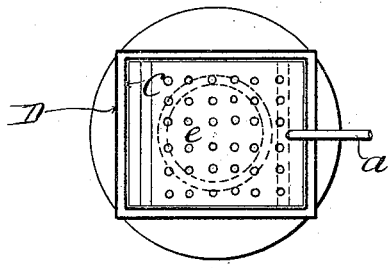

No. 607,059. Patented July 12, 1898.
W. LAWRENCE.
APPARATUS FOR PURIFYING WATER.
(Application filed Nov. 21, 1896.)
(No Model.)

Witnesses
A. J. Haddau
D. Hazlett

Inventor
William Lawrence.
by his Attorney A. Haddau

UNITED STATES PATENT OFFICE.

WILLIAM LAWRENCE, OF LONDON, ENGLAND.

APPARATUS FOR PURIFYING WATER.

SPECIFICATION forming part of Letters Patent No. 607,059, dated July 12, 1898.

Application filed November 21, 1896. Serial No. 613,008. (No model.) Patented in England September 12, 1894, No. 17,372.

*To all whom it may concern:*

Be it known that I, WILLIAM LAWRENCE, a subject of the Queen of Great Britain, and a resident of Chiswick, London, England, have invented certain new and useful Improvements in Water Softening and Sterilizing Apparatus, (for which I have obtained Letters Patent in Great Britain, No. 17,372, dated September 12, 1894,) of which the following is a specification.

This invention relates to apparatus for the treating of water or contaminated liquids in such a manner as to remove their objectionable qualities by processes of softening, sterilizing, or depositing, and when any particular water requires filtering a filter may be used in conjunction.

One of the principal features of this invention is the purifying and softening of water by means of heat so applied that the salts of lime and other matters may be the better thrown out of solution, precipitated, and caused to aggregate and separate from the water.

Another feature is the prevention or reduction to the minimum of incrustation of precipitated sedimentary matter upon the heating-surfaces.

Another feature is the manner of depositing and removal of the sedimentary matter from the water.

When a liquid is heated in a vessel in the ordinary way, a circulating action is set up and the heated portions rise toward the surface, while the parts not heated descend. In this way the whole of the liquid in the vessel is maintained at practically a uniform temperature and only something approaching the boiling temperature is arrived at or reached. In other words, the temperature of the liquid does not increase in proportion to its columnar pressure and the descending portions of the liquid tend to absorb the heat and the dispelled gases and vapors from the portions ascending, causing a reabsorption of the gases and vapors that were for the moment dispelled. Again, I have observed that when crude water is heated by stages gases contained in it pass off in regular order as the temperature increases, those gases that have the least solubility in the water or affinity for substances dissolved in the water passing off at the lower temperatures and those that have the greatest at the higher temperatures. Now since the gases in the water tend to buoy up the particles thrown out of solution and to prevent them from settling it becomes of the first importance to dispel the gases as much as possible before the salts of lime are thrown out of solution.

Now an important part of the present invention is the prevention of the natural action of the circulation set up by boiling or heating and the dispelling of the gases in regular order. To effect this, I employ a heating or boiling vessel in which there are suitably-disposed shelves, trays, pans, and diaphragms that intercept the steam or vapors of ebullition and so prevent the circulation of the liquid. I then pass the water in at the top part of the vessel in a cold or partially-heated state and cause it to pass down through suitable openings, perforations, or passages toward the lower part of the vessel. Then applying heat at or near the bottom of the vessel I cause the steam arising to pass up through the limited orifices by which the water passes down. By so locating the ebullition the highest temperature due to columnar pressure is attained and the reabsorption of dispelled gases in the lower parts of the heating vessel prevented, the steam being in some cases ultimately absorbed in the descending water.

In the annexed drawing is shown an elevation and plan of the apparatus.

The supply-inlet pipe $a$ serves to deliver the water to the top part of the sterilizing vessel C. This vessel C, which is square-shaped at top and cylindrically-shaped below, is contained in a vessel similarly shaped as regards its upper and middle parts, but has a dome-shaped base, under which is placed a lamp L. The outlet-pipe $b$ delivers the boiled treated water from the vessel D at or near the level of the top of the latter, and its position is important, since it governs the water-level in the apparatus, and consequently the columnar pressure therein.

The size, proportions, and depth of the apparatus must be determined by the purpose for which it is intended and the boiling temperature required to be maintained. The greater the columnar pressure the higher will be the boiling temperature. In order to effect complete sterilization, sometimes the boiling temperature at sea-level should be exceeded. Again, in high mountain districts where the barometrical pressure is reduced below the ordinary cooking temperature, columnar pressure is necessary. There are organisms the spores of which will resist 212° Fahrenheit. To make sure of their destruction, a columnar pressure of perhaps twelve feet may be necessary. Such a pressure giving a boiling temperature of at least 225° Fahrenheit should suffice for their destruction. A columnar pressure of eighteen feet might sometimes be desirable, especially at high levels in mountainous districts. Again, for the larger uses—such as for steam-boilers, public institutions, public baths, or even for town supplies—several sterilizing vessels may be inclosed in one outer vessel, and the heating medium may be direct fires or steam—either high pressure or waste or exhaust steam.

In the upper part of the vessel C above the water-level are perforated trays e, and below the latter in the lower or cylindrical part of the vessel C below the water-level are a number of diaphragms f, fixed one above the other at suitable distances apart upon a central rod g, so as to be removable therewith for cleaning purposes. These diaphragms act as current-intercepting ebullition-plates and divide the boiling vessel C below the water-line into superposed chambers, so as to cause the boiling to take place by stages, the diaphragms being sometimes split and bent upward and downward, so as to form oblique or helical passage-ways. There is also at the lowest part of the vessel C a truncated cone which serves to direct the ebullition upward.

The vessel C has communication with the vessel D through the holes k. The lower holes k' serve to pass the steam from the lower and extended part of the vessel D.

In action the crude water entering the vessel C at the highest point descends first upon the trays e, where the carbonate salts are for the most part deposited. It then falls into the body of water in the vessel and gradually descends past the diaphragms f and is heated by successive stages on meeting the vapors of ebullition. The whole of the ebullition being concentrated or located by the diaphragms, the gases would be driven off, a considerable body of the sulfates removed, and the softened water would become clarified. It next would flow out of C into the vessel D by the holes k, and rising upward would flow out through the pipe b, the position of which above the level of the diaphragms f, but below that of the trays e, governs the position of the water-level in the apparatus. The heating medium may be an Argand burner L, as used for supplying light, and placed under the vessel D, as shown.

This invention extends to a vessel containing diaphragms employed as aforesaid—that is to say, with superposed diaphragms as below the water-level, so that the boiling therein occurs under a columnar pressure due to the height of the vessel or the water-outlet. In such a vessel I may add trays above the water-level.

I therefore claim as my invention—

1. The combination with a vessel C having an inlet in the upper part thereof of superposed diaphragms f below the intended water-level, the said diaphragms dividing the vessel C into superposed compartments with orifices of communication in said diaphragms, an exterior vessel D having communications with vessels C below the lowermost diaphragm and having an outlet at such a level as to maintain the water-level above the diaphragms.

2. The combination with a vessel C having an inlet in the upper part thereof, of superposed trays e, below said inlet and superposed diaphragms f below said trays, the latter dividing the vessel into superposed compartments with orifices of communication in said diaphragms, an exterior vessel D having communication with vessel C below the lowermost diaphragm and having an outlet at such a level as to maintain the water-level above the level of said diaphragms but below that of the trays e for the purpose set forth.

In witness whereof I have signed this specification in presence of two witnesses.

WILLIAM LAWRENCE.

Witnesses:
R. HADDAN,
A. J. HADDAN.